(12) United States Patent
Valkealahti

(10) Patent No.: US 6,778,839 B2
(45) Date of Patent: Aug. 17, 2004

(54) METHOD AND DEVICE FOR TRANSMISSION POWER SELECTION AND BIT RATE SELECTION FOR CHANNELS WITH OPEN LOOP POWER CONTROL

(75) Inventor: Kimmo Valkealahti, Helsinki (FI)

(73) Assignee: Nokia Corporation, Espoo (FI)

( * ) Notice: Subject to any disclaimer, the term of this patent is extended or adjusted under 35 U.S.C. 154(b) by 468 days.

(21) Appl. No.: 09/753,213

(22) Filed: Jan. 2, 2001

(65) Prior Publication Data

US 2002/0128031 A1 Sep. 12, 2002

(51) Int. Cl.⁷ .................................................. H04B 7/00
(52) U.S. Cl. ........................................ 455/522; 455/69
(58) Field of Search ............................ 455/69, 52, 550, 455/67.3, 512, 436, 437, 522; 370/252, 329, 335, 342, 318, 349, 332, 331

(56) References Cited

U.S. PATENT DOCUMENTS

| | | | |
|---|---|---|---|
| 6,167,031 A | | 12/2000 | Olofsson et al. |
| 6,473,467 B1 | * | 10/2002 | Wallace et al. ............. 375/267 |
| 6,546,252 B1 | * | 4/2003 | Jetzek et al. ................ 455/437 |
| 6,571,089 B1 | * | 5/2003 | Richards et al. ............ 455/266 |
| 2002/0080765 A1 | * | 6/2002 | Zeira et al. ................. 370/347 |
| 2002/0085502 A1 | * | 7/2002 | Chheda et al. .............. 370/252 |
| 2002/0093926 A1 | * | 7/2002 | Kilfoyle ..................... 370/335 |

FOREIGN PATENT DOCUMENTS

| | | |
|---|---|---|
| EP | 0942541 | 9/1999 |
| EP | 0986282 | 3/2000 |

OTHER PUBLICATIONS

Technical Specification 3GPP TS 05.08, Version 8.6.0 (Sep. 2000): *3rd Generation Partnership Project; Technical Specification Group GERAN; Digital cellular telecommunications system (Phase 2+); Radio subsystem link control (Release 1999)*, Global System for Mobile Communications, 3GPP, Annex B: Power Control Procedures, pp. 85–88.

\* cited by examiner

*Primary Examiner*—Nay Maung
*Assistant Examiner*—Tu X Nguyen

(57) ABSTRACT

A method and device for selecting transmission power and bit rate in a wireless telecommunications network, especially in the context of open loop power control, is disclosed. Transmission power and bit rate are selected in response to input parameters so as to minimize a cost function representing induced interference and transport delay.

30 Claims, 4 Drawing Sheets

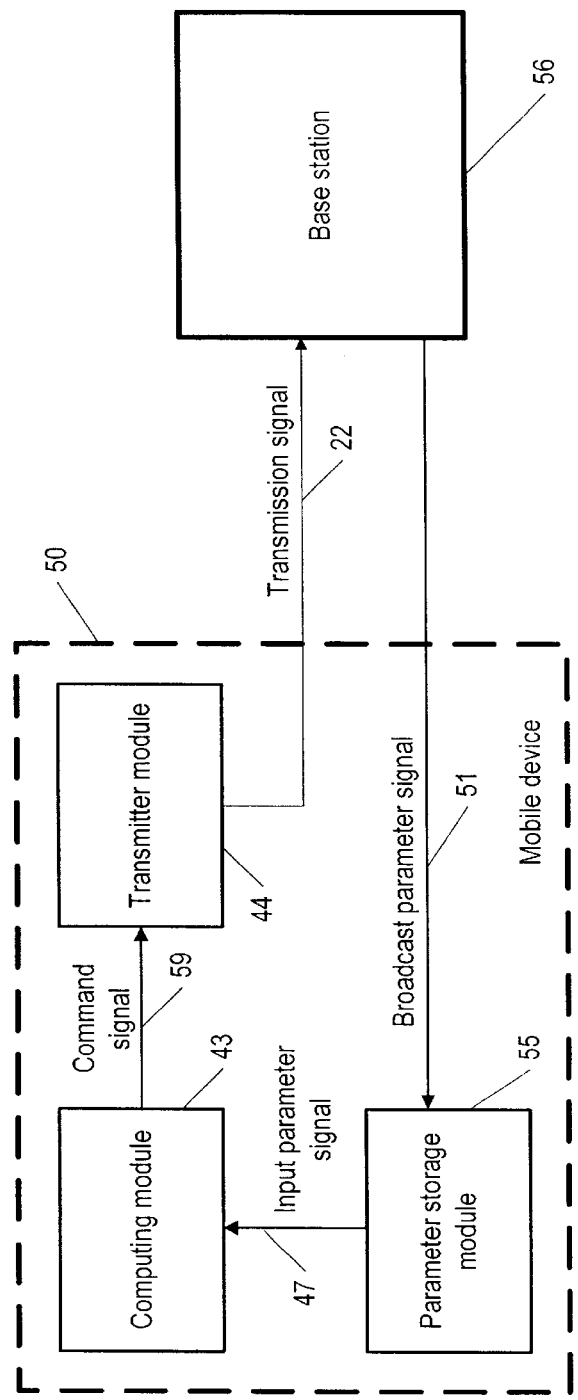
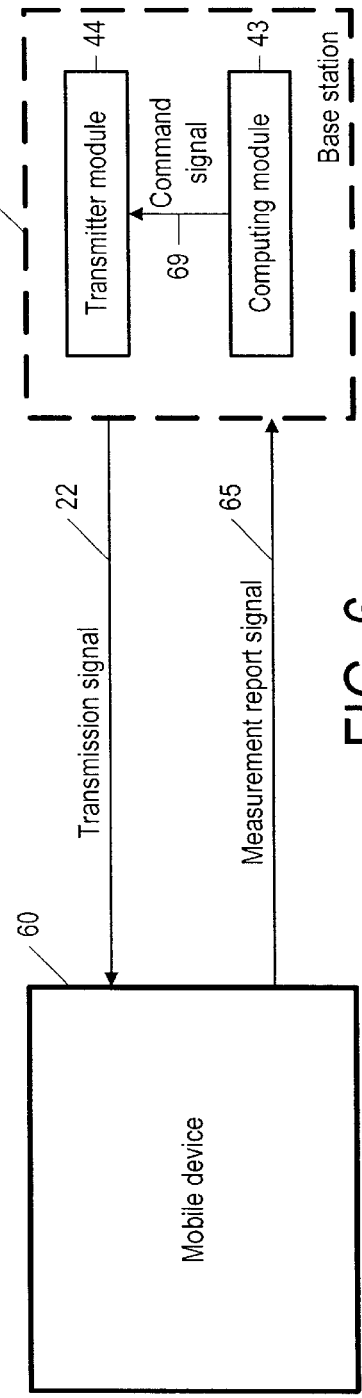
FIG. 5
FIG. 6

METHOD AND DEVICE FOR TRANSMISSION POWER SELECTION AND BIT RATE SELECTION FOR CHANNELS WITH OPEN LOOP POWER CONTROL

TECHNICAL FIELD OF THE INVENTION

This invention relates generally to the field of signal transmission in a wireless telecommunications network, and more particularly to power control.

BACKGROUND ART

In an open loop power control system, transmission power is selected without benefit of immediate feedback, and thus without exact knowledge of the power level necessary to insure faultless signal reception at the other end of the transmission. Consequently, a typical transmitting device in an open loop power control system necessarily makes power estimates based upon incomplete information. If a power estimate is too low, then the signal will not be received at the other end of the transmission; but if the power estimate is too high, then the signal interferes needlessly with other users. Both the problem of low power estimation and the problem of high power estimation occur in the prior art, due to inadequate estimation methods. See, for example, $3^{rd}$ Generation Partnership Project; Technical Specification Group GERAN; Digital Cellular Telecommunications System, Phase 2t; Radio Subsystem Link Control (3GPP TS 05.08 V8.6.0, September 2000, Annex B, pages 85–88). This is a problem in the downlink from a base station to a mobile device, and in the uplink direction as well.

A further problem with prior art is the problem of fixed bit rate. When bit rate is fixed and constant, then transmission power is correspondingly limited. If the fixed bit rate is high, then high transmission power is required, which may induce excessive interference. However, if the fixed bit rate is low, then the transmission is slower (i.e., large transport time) and the transmission channel is occupied longer at the expense of other users. It is therefore evident that a fixed bit rate makes it difficult or impossible to adjust transmission power so as to minimize both transport time and induced interference. This is a major problem in prior art, wherein the bit rate is typically a constant, possibly chosen based upon traffic estimation.

Even when the prior art employs a fixed bit rate, the limited flexibility of the transmission power is often not exploited. For example, in the downlink, power transmission in prior art may be a constant that is chosen by radio network planning. In the uplink, power transmission may be adjustable, but only according to the uplink pathloss (i.e., signal attenuation) presumed equal to the measured downlink pathloss. The uplink transmission power may also be adjusted depending upon what sector the mobile transmitter is located in; a sector-specific constant offset may be broadcast in each sector. The rudimentary nature of all of these prior art techniques results in transmission power that induces excessive interference, and results in bit rates that produce excessive transport delays.

DISCLOSURE OF THE INVENTION

The central idea of the present invention is to select bit rate and transmission power so as to minimize the induced interference problem and the transport delay problem. According to the present invention, neither bit rate nor transmission power is constant. In comparison to methods with fixed bit rate or transmission power, the present method makes better use of the available radio resource in diverse load conditions, and the result is higher throughput with lower system interference.

The method and device of the present invention provide a wireless transmission signal having appropriate transmission power and bit rate. To accomplish this, a set of input parameters are used to calculate bit rate and transmission power that minimize a cost function representing induced interference and transport delay. A command signal indicates the calculated bit rate and calculated transmission power in response to the input parameters which were provided by an input parameter signal. The invention then provides the transmission signal having the bit rate and transmission power dictated by the command signal.

The command signal is provided by a computing module in response to the input parameter signal. The command signal is received by a transmitter module, which provides the transmission signal having the bit rate and transmission power determined by the computing module.

This invention can operate in either the uplink direction (i.e. from a mobile device to a base station) or the downlink direction (i.e. from a base station to a mobile device), or both, in a wireless telecommunications system. This invention is especially designed for a system employing open loop power control.

BRIEF DESCRIPTION OF THE DRAWINGS

FIG. 5 shows the structure of a mobile device according to the present invention.

FIG. 6 shows the structure of a base station according to an embodiment of the present invention.

BEST MODE FOR CARRYING OUT THE INVENTION

Figure 1:
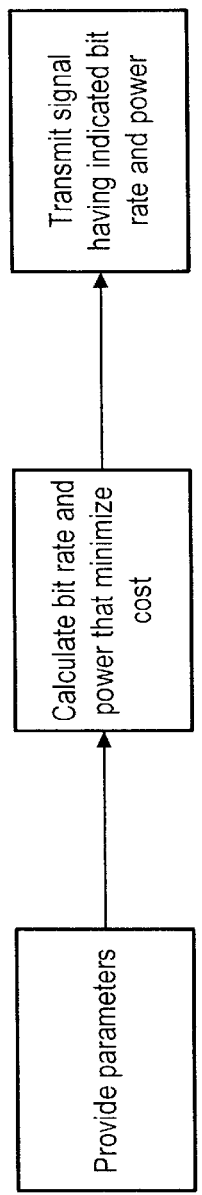
FIG. 1 is a flow chart showing steps of an embodiment of the present invention.
Figure 2:
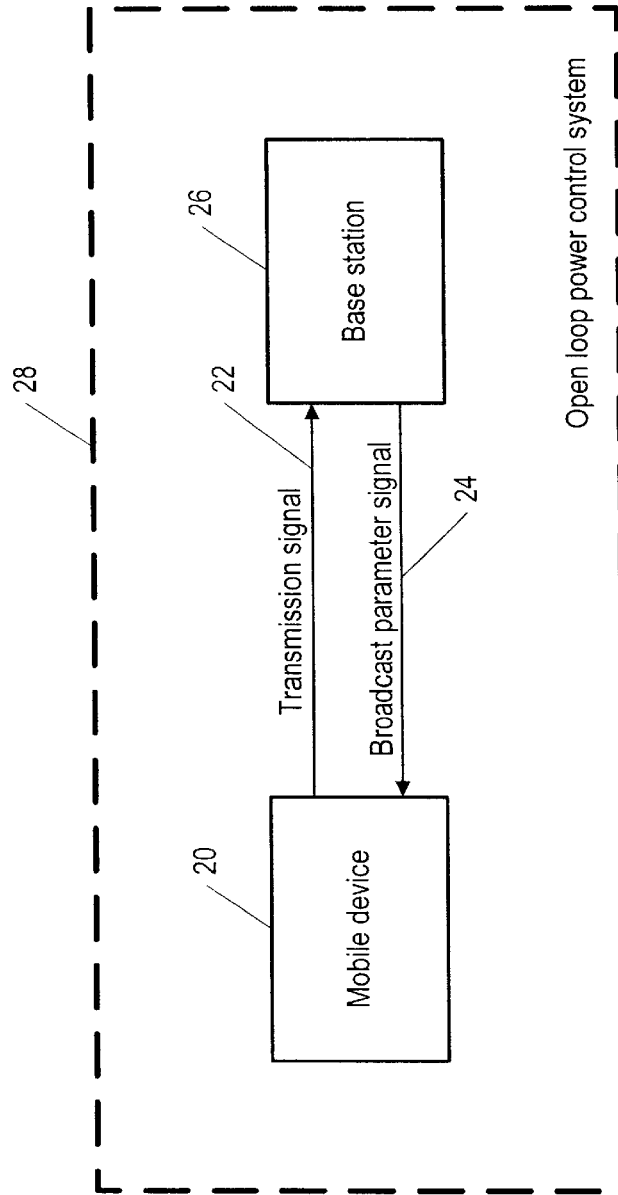
FIG. 2 is a diagram showing how the invention works in the uplink direction.

As can be seen in the flow chart of FIG. 1, the best mode for carrying out the present invention essentially involves providing a set of input parameters, calculating from those parameters the bit rate and transmission power that minimize cost, and then sending the transmission signal having the calculated bit rate and the calculated transmission power. This method provides a transmission signal having appropriate transmission power and bit rate in a wireless telecommunications system, for example a telecommunications system employing wideband code division multiple access (WCDMA). Typically, this will involve signals transmitted between a mobile device 20 and a base station 26 as seen in FIG. 2, in the context of an open loop power control system 28. The cost function represents induced interference and transport delay, and thus the present invention is aimed at minimizing interference and delay.

FIG. 2 shows a preferred embodiment of the best mode, in which the transmission signal 22 goes in the uplink direction from the mobile device 20 to the base station 26. However, in other embodiments of the best mode, the present invention can operate in the downlink direction, as seen in the open loop power control system 28 of FIG. 3.

Figure 4:
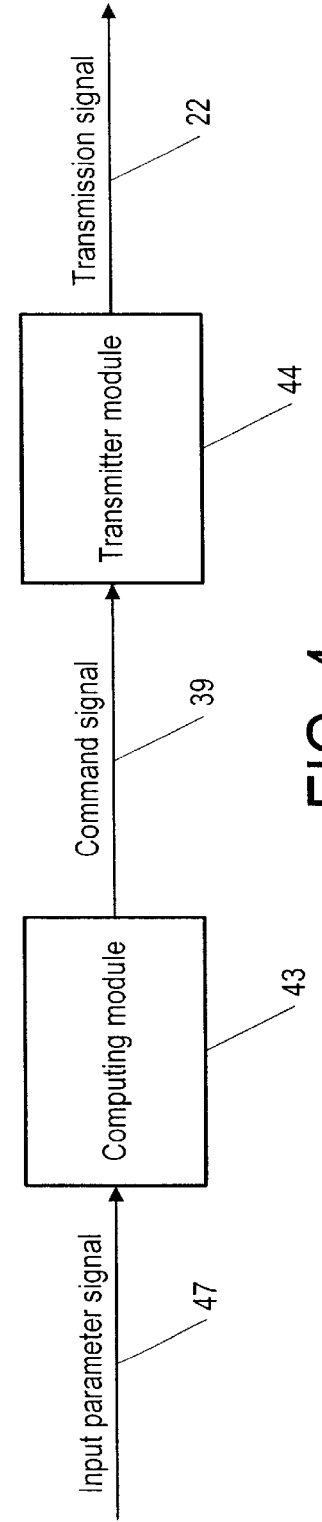
FIG. 4 is a diagram showing how the present invention works regardless of whether transmission is uplinked or downlinked.

Regardless of whether the transmission signal 22 is in the downlink or the uplink direction, the method and device of the present invention can be seen from FIG. 4, which is independent of the transmission direction. FIG. 4 shows that a command signal 39 is provided in response to an input parameter signal 47. The command signal has a magnitude indicative of calculated transmission bit rate and calculated transmission power, which in turn have magnitudes selected to minimize a cost function representing induced interference and transport delay. FIG. 4 also shows that a transmission signal 22 is provided in response to the command signal 39, and the transmission signal 22 employs the calculated transmission bit rate and the calculated transmission power.

Returning to FIG. 2, which involves an uplink transmission signal 22, an additional step involves a broadcast parameter signal 24 being provided by the base station 26. This broadcast parameter signal 24 has a magnitude indicative of at least one of the input parameters. In other words, at least one of the input parameters can be broadcast to the mobile device 20. The input parameter signal 47 shown in FIG. 4 is provided in response to the broadcast parameter signal 24, and may include the broadcast paremeter(s) as well as other parameters that need not be broadcast from the base station 26.

Figure 3:
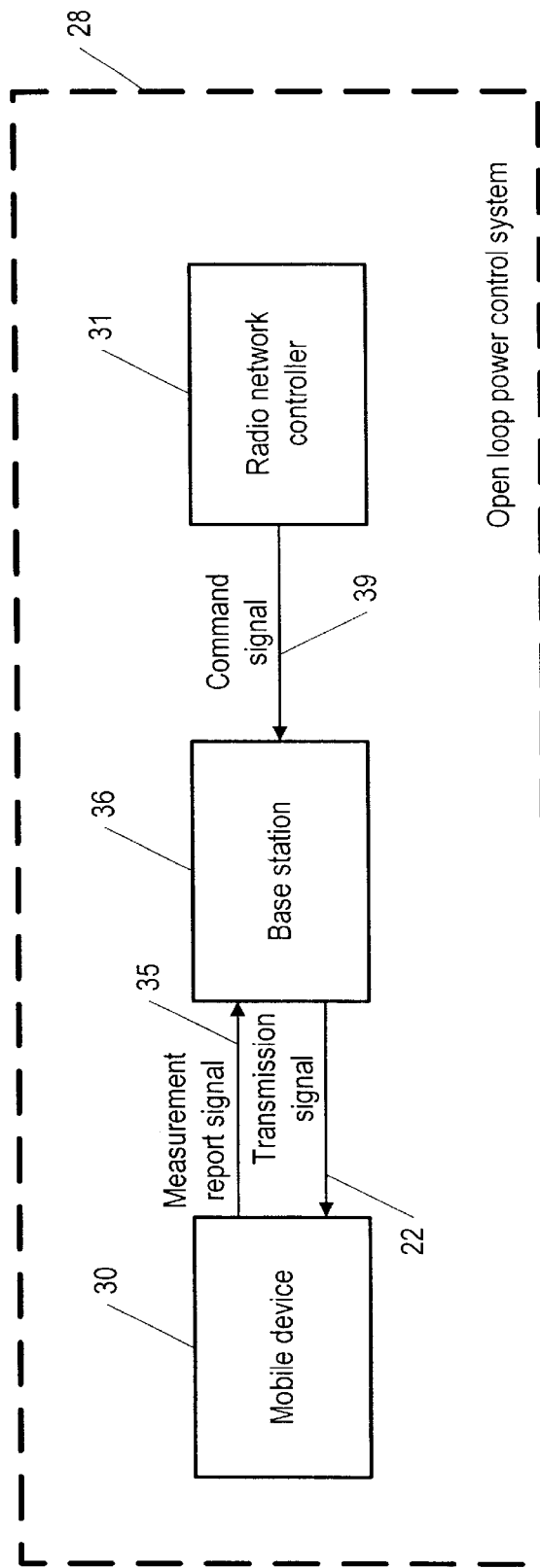
FIG. 3 is a diagram showing how the present invention works in the downlink direction.

FIG. 3, which involves a downlink transmission signal 22 from the base station 36 to the mobile device 30, exemplifies the situation where the command signal 39 is provided by a radio network controller 31 to the base station 36. However, it is certainly possible for the command signal 39 to be generated and sent entirely within the base station 36 without involvement of the radio network controller 31.

In order to properly and fully understand the present invention, it is important to understand the underlying principles. High transmission power is desirable to ensure reception at the opposite device, and high transmission power is also desirable so that data transmission can occur at a high bit rate (b) and thus without overutilizing channels and delaying other users. A simple model of the interrelation between the bit rate (b) and the transmission power (p) may be given by this formula:

$$p = \frac{E \cdot L \cdot I}{C} \cdot b, \qquad (1)$$

which shows that a higher transmission power (p) allows a higher bit rate (b) in a WCDMA system. In formula (1), "L" represents pathloss which measures the amount of signal attenuation, "I" is the total interference, "C" is the chip rate, and "E" stands for "ebno" which is the ratio of received bit energy to received total interference density required for proper signal decoding.

Despite the desirable advantages of higher transmission power (p), higher transmission power will also tend to cause more induced interference ($I_i$), which may in turn disrupt other users. In other words, raising or lowering bit rate (b) and transmission power (p) involves a trade-off between induced interference ($I_i$) and transport delay (d). Thus, selecting high transmission power (p) and/or bit rate (b) has associated costs, just as selecting low transmission power (p) and/or bit rate (b) has different associated costs.

Preferred embodiments of the present invention minimize a linear cost function F(b) that is linearly dependent upon induced interference ($I_i$) and transport delay (d), and thus the cost function represents the aforementioned trade-off:

$$F(b) = K_1 I_i + K_2 d. \qquad (2)$$

Throughout this disclosure, "K" with a subscript indicates a quantity that is independent of bit rate (b). It can be assumed that the induced interference ($I_i$) is directly proportional to the bit rate (b) so that $I_i = K_3 b$. Likewise, it can be assumed that the transport delay (d) is inversely proportional to the bit rate (b) and directly proportional to the packet size (S) so that d=S/b gives the transport time of a packet. Equation (2) therefore leads to the following, where we set $K_4 = K_1 K_3$:

$$F(b) = K_4 b + \frac{K_2 \cdot S}{b}. \qquad (3)$$

In order to minimize this cost function, we can simply differentiate equation (3) with respect to the bit rate (b), and set this derivative equal to zero. Using this procedure, it is found that cost is minimized when bit rate is given by this formula:

$$b = \sqrt{\frac{K_2 \cdot S}{K_4}}. \qquad (4)$$

Notice that, for large bit rates, equation (3) dictates that the function F is approximately equal to $K_4 b$. Likewise, for large time delays, we have small bit rates according to the formula d=S/b discussed above, so equation (3) tells us that F is approximately equal to $K_2 \cdot S/b = K_2 d$. Because our object is to limit cost, we assume that cost (F) above a maximum amount is not allowable, and therefore we find that $K_2 \cdot D$ can be equated to $K_4 \cdot B$ where "D" is the maximum value of transport delay (d) and "B" is the maximum value of bit rate (b). Inserting this result into equation (4) allows equation (4) to be rewritten as follows:

$$b = \sqrt{\frac{B}{D} \cdot S}. \qquad (5)$$

It is straightforward to obtain from equation (1) a formula for the maximum value "P" of transmission power (p) that applies in the special case when cost (F) is at its maximum:

$$P = \frac{E \cdot L \cdot I}{C} \cdot B. \qquad (6)$$

This formula (6) can now be used to eliminate the maximum bit rate (B) from equations (1) and (5), and it is then useful to solve for transmission power (p) and bit rate (b). We are thus able to reach the following two novel formulae for bit rate (b) and transmission power (p) in terms of packet size (S), chip rate (C), maximum transmission power (P), maximum transport delay (D), ebno (the ratio "E" between received bit energy and received total interference density required for proper signal decoding), pathloss (L), and total interference (I):

$$b = \sqrt{\frac{S \cdot C \cdot P}{D \cdot E \cdot L \cdot I}}. \tag{7}$$

$$p = \sqrt{\frac{S \cdot E \cdot L \cdot I \cdot P}{D \cdot C}}. \tag{8}$$

Equations (7) and (8) exemplify how bit rate (b) and transmission power (p) can be selected according to the present invention, for the uplink and/or for the downlink, using open loop power control. All of the quantities on the right-hand-sides of equation (7) and (8) are input parameters that may be included in the input parameter signal 47 shown in FIG. 4.

To compensate for a possible bias, the ebno parameter (E) could be regularly adjusted so that it is slightly increased when a frame error is detected, and decreased when a frame is received correctly. The amounts of increase and decrease can be selected to give a target frame error rate, on average. Uplink frame errors can be directly detected by a radio network controller (RNC); for detecting downlink frame errors, the RNC can use information about retransmission requests.

When the cost of a transmission signal in the uplink direction is to be minimized, ebno (E) and total interference (I) in a particular geographic sector can be broadcast to the user equipment (UE), and the UE can then use these broadcast values to determine bit rate and transmission power according to equations (7) and (8). Moreover, the UE can approximate pathloss (L) from the measured signal-to-interference ratio (SIR) of a common broadcast channel, the broadcast channel's transmission power (BCTP) also being broadcast.

The formulae (7) and (8) can also be used to select bit rate (b) and transmission power (p) for the downlink. In that case, the radio network controller (RNC) can approximate the product of pathloss (L) and total interference (I) because that product is needed to calculate the transmission power and bit rate.

There are various alternative ways for the RNC to approximate the product of pathloss and total interference. The first way assumes that the RNC has recently received a measurement report from the UE, including the signal-to-interference ratio (SIR) of the common broadcast channel, and also assumes that the measured SIR is that of the received common channel power to the total wideband interference. The measured SIR, together with sector total transmission power (STTP), broadcast channel transmission power (BCTP), and planned or measured downlink code orthogonality (DCO), yield the product of pathloss and total interference:

$$L \cdot I = \frac{BCTP}{SIR} - DCO \cdot STTP. \tag{9}$$

FIG. 3 shows a measurement report signal 35 provided by the mobile device 30 to the base station 36, and this measurement report signal 35 may have a magnitude indicative of measured SIR. Note that formula (9) can very easily be derived algebraically from the following four equations:

$$I_W = I_{INTRA} + I_{INTER} + I_{NOISE}. \tag{10a}$$

$$I = (1 - DCO) I_{INTRA} + I_{INTER} + I_{NOISE}. \tag{10b}$$

$$SIR = \frac{BCTP}{L \cdot I_W}. \tag{10c}$$

$$I_{INTRA} = \frac{STTP}{L}. \tag{10d}$$

Equation (10a) is simply a statement that total wideband interference ($I_W$) may be defined as the sum of intra-cell interference ($I_{INTRA}$), inter-cell interference ($I_{INTER}$), and noise ($I_{NOISE}$) such as thermal noise. Equation (10b) indicates that, in the downlink, the observed total interference (I) is somewhat lower than the total wideband interference ($I_W$) given by equation (10a), due to orthogonality of codes. Equation (10c) is simply a consequence of SIR measuring standards. Equation (10d) indicates that the intra-cell interference ($I_{INTRA}$) is equal to the sector total transmission power (STTP) divided by the pathloss (L) between the sector antenna and the UE.

The second way for the RNC to approximate the product of pathloss (L) and total interference (I) is by estimating the average pathloss-interference factor in a sector, based on transmission powers of active users in the sector. Fast closed-loop power control adjusts the transmission powers to just outbalance the downlink pathloss-interference factors, and thus the individual pathloss-interference factors can be determined from the individual transmission power ($p_i$), bit rate ($b_i$), planned ebno ($E_i$) and chip rate (C), yielding this average pathloss-interference factor for "N" users in the sector:

$$L \cdot I = \frac{C}{N} \sum_{i=1}^{N} \frac{p_i}{b_i E_i}. \tag{11}$$

The accuracy of this statistical formula (10) depends upon the number and distribution of users in the sector, and on the accuracy of planned ebno values. Other statistical formulas could be warranted instead of the averaging formula (11); for example, less than all of the N users in the sector could be sampled, and/or a weighted average could be employed, and/or an offset could be added to the product of pathloss (L) and total interference (I).

The third way for the RNC to approximate the product of pathloss (L) and total interference (I) is as follows:

$$L \cdot I = (1 + ICI - DCO) \cdot STTP. \tag{12}$$

This formula (12) assumes that the mobile device is located in a sector where interference from outside the sector has a fixed ratio (ICI) to interference from inside the sector, and also assumes that noise ($I_{NOISE}$) is negligible. Note that formula (12) can be easily derived algebraically from equations (10b) and (10d). The ICI value may be measurable, or alternatively a constant value suggested by radio network planning may be used (an ICI value of 0.5 is typical).

As discussed previously, the present invention involves a method as well as a device for carrying out that method. FIG. 4 shows two essential components of the best mode for carrying out this invention: namely, a computing module 43 and a transmitter module 44. The computing module 43 essentially takes the input parameters and uses them to calculate the appropriate transmission bit rate and the appropriate transmission power, and those two appropriate values are then communicated to the transmitter module 44 which then sends a transmission signal having the bit rate and transmission power dictated by the computing module 43.

A mobile device 50 according to the present invention is detailed in FIG. 5, and this mobile device 50 interacts with a base station 56. Of course, it will be well understood by those skilled in the art that FIG. 5, and the other figures, depict components and signals that are especially relevant to the present invention; these figures do not detail the many other features which may be included in a mobile device 50 and a base station 56. In the embodiment shown by FIG. 5, a parameter storage module 55 maintains and updates the input parameters, which are provided to the computing module 43 via an input parameter signal 47. One source for at least part of the input parameters is a broadcast parameter signal 51 from the base station 56 to the parameter storage module 55. The computing module 43 responds to the input parameter signal 47 by providing a command signal 59 to the transmitter module 44, and the transmitter module 44 in turn provides the transmission signal 22 to the base station 56 at the bit rate and power dictated by the command signal 59. It should be emphasized that, as those skilled in the art will realize, all of the components and signals described herein may be properly considered as preferred structures and interactions that can be implemented in a variety of different ways by a variety of different hardware and software combinations.

As can be seen from FIG. 6, the base station 66 may be equipped with a transmitter module 44 and a computing module 43 for use in downlink transmissions. The transmission signal 22 goes from the base station 66 to the mobile device 60. FIG. 6 does not explicitly show a parameter storage module as in FIG. 5, but such a parameter storage module could easily be added; however, one may also simply assume that the computing module 43 includes components which perform the functions of a parameter storage module. The measurement report signal 65 in FIG. 6 is comparable to the measurement report signal 35 already discussed with reference to FIG. 3, and this measurement report signal 65 has a magnitude that may be indicative of measured SIR. In FIG. 6, the command signal 69 is both sent and received within the base station 66, because both the computing module 43 and the transmitter module 44 are located within the base station 66.

Figure 7:
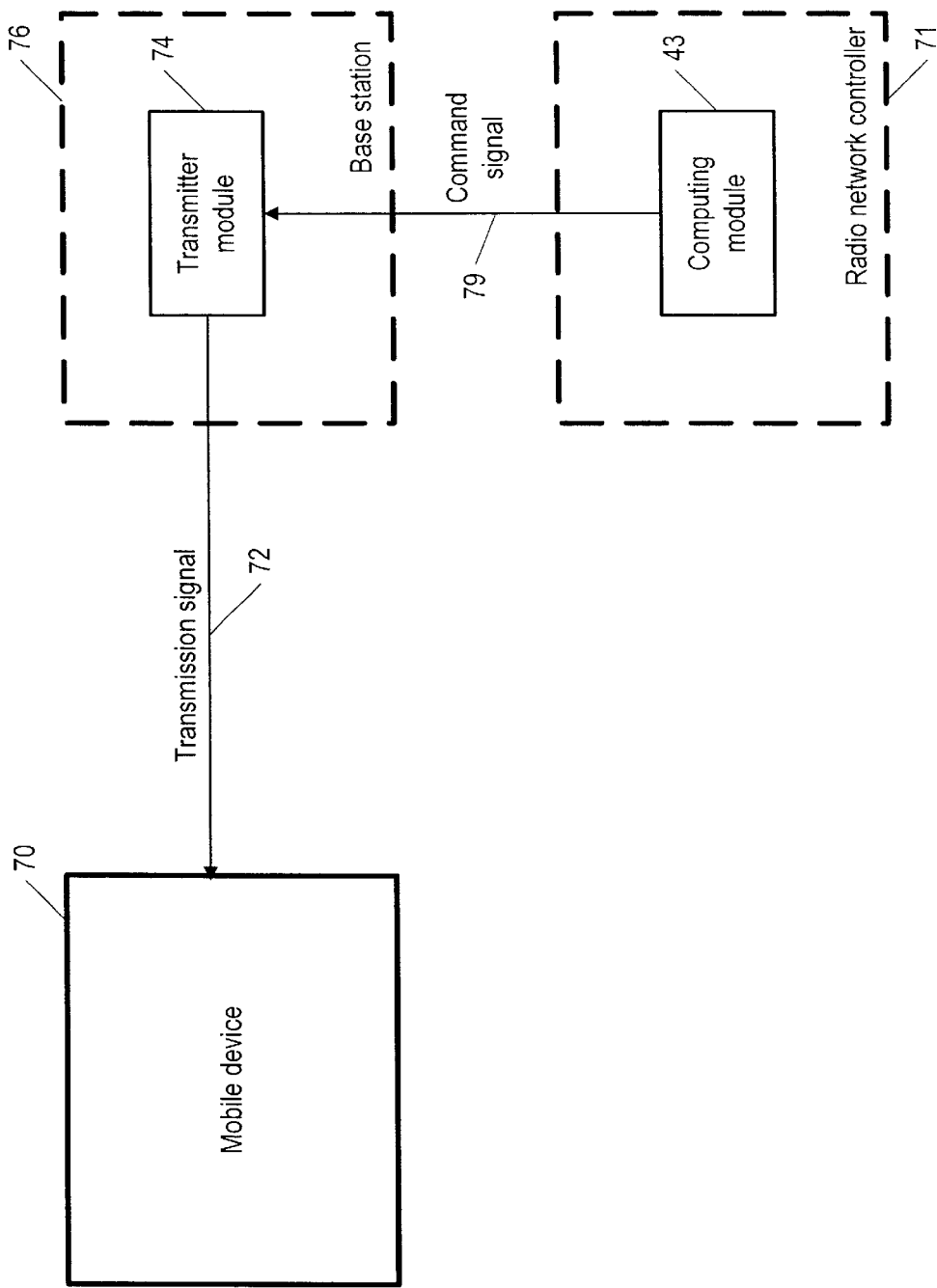
FIG. 7 shows how a mobile device, a base station, and a radio network controller interact according to an embodiment of the present invention.

An alternative embodiment is shown by FIG. 7, in which the transmitter module 74 is located at the base station 76 but the computing module 43 is located at the RNC 71. Thus, the command signal 79 goes from the RNC 71 to the base station 76. Of course, the transmission signal 72 goes from the base station 76 to the mobile device 70.

Although this invention has been shown and described with respect to a best mode embodiment thereof, it should be understood by those skilled in the art that the foregoing and various other changes, omissions and additions in the form and detail thereof may be made therein without departing from the spirit and scope of the invention.

What is claimed is:

1. A method for providing a transmission signal having appropriate transmission power and bit rate, in a wireless telecommunications system, comprising the steps of:
   providing a command signal (39) having a magnitude indicative of calculated transmission bit rate and calculated transmission power, in response to an input parameter signal (47), said calculated transmission bit rate and said calculated transmission power having magnitudes selected to minimize a cost function representing induced interference and transport delay, and providing the transmission signal (22) having the calculated transmission bit rate and the calculated transmission power, in response to the command signal (39).

2. The method of claim 1, wherein said steps are carried out in an open loop power control system (28).

3. The method of claim 2, wherein the cost function is a linear function of the induced interference and the transport delay.

4. The method of claim 2 further comprising the step of providing a broadcast parameter signal (24), wherein the transmission signal (22) is from a mobile device (20) to a base station (26), the broadcast parameter signal (24) has a magnitude indicative of at least one of the input parameters, and the input parameter signal (47) is provided in response to the broadcast parameter signal (24).

5. The method of claim 2, wherein the input parameter signal (47) has a magnitude indicative of input parameters that include pathloss (L) and total interference (I) as a product (L·I).

6. The method of claim 5, wherein the input parameters also include maximum delay (D), maximum power (P), ebno value (E), chip rate (C), and packet size (S).

7. The method of claim 6, wherein the bit rate (b) is given by $$b = \sqrt{\frac{P \cdot C \cdot S}{D \cdot E \cdot L \cdot I}}.$$

8. The method of claim 7, wherein the transmission power (p) is given by $$p = \sqrt{\frac{S \cdot E \cdot L \cdot I \cdot P}{D \cdot C}}.$$

9. The method of claim 5, wherein the transmission signal (22) is sent from a base station (36) to a mobile device (30), and wherein the product of pathloss and interference is approximately calculated prior to sending the transmission signal (22) in order to determine bit rate and transmission power of the transmission signal (22).

10. The method of claim 9, wherein transmission bit rate and transmission power is calculated at a radio network controller (31).

11. The method of claim 9, wherein the product of pathloss and interference is approximated using a measurement report signal (35) from the mobile device (30), the measurement report signal (35) having a magnitude indicative of measured signal-to-interference ratio.

12. The method of claim 9, wherein the product of pathloss and interference is approximated by statistically examining other active users in a sector.

13. The method of claim 9, wherein the product of pathloss and interference is estimated based on an assumption that the mobile device (30) is located in a sector where interference from outside the sector is a fixed proportion of interference from inside the sector.

14. The method of claim 6, wherein the ebno value is increased when a frame error is detected, and decreased when a frame is received correctly.

15. The method of claim 2, wherein the wireless telecommunications system employs wideband code division multiple access.

16. A device for transmitting a signal having appropriate transmission power and bit rate, in a wireless telecommunication system, comprising:
   a transmitter module (44), responsive to an command signal (39) having a magnitude indicative of calculated transmission bit rate and calculated transmission power, for providing a transmission signal (22) having the calculated transmission bit rate and the calculated transmission power; and a computing module (43), responsive to an input parameter signal (47), for providing the command signal (39), said transmission bit rate and said transmission power having magnitudes selected to minimize a cost function representing induced interference and transport delay.

17. The device of claim 16, wherein open loop power control is employed.

18. The device of claim 17, wherein the cost function is a linear function of the induced interference and the transport delay.

19. The device of claim 17 further comprising a parameter storage module (55) responsive to a broadcast parameter signal (51), for providing the input parameter signal (47), wherein the transmitter module (44), the parameter storage module (55) and the computing module (43) are located at a mobile device (50), and wherein the broadcast parameter signal (51) has a magnitude indicative of at least one of the input parameters.

20. The device of claim 17, wherein the input parameter signal (47) has a magnitude indicative of input parameters that include pathloss (L) and total interference (I) as a product (L·I).

21. The device of claim 20, wherein the input parameters also include maximum delay (D), maximum power (P), ebno value (E), chip rate (C), and packet size (S).

22. The method of claim 21, wherein the bit rate (b) is given by $$b = \sqrt{\frac{P \cdot C \cdot S}{D \cdot E \cdot L \cdot I}}.$$

23. The method of claim 22, wherein the transmission power (p) is given by $$p = \sqrt{\frac{S \cdot E \cdot L \cdot I \cdot P}{D \cdot C}}.$$

24. The device of claim 20, wherein the transmitter module (44) is located at a base station (66), and wherein the computing module (43) is equipped and programmed to approximately calculate the product of pathloss and interference in order to determine bit rate and transmission power of the transmission signal (22).

25. The device of claim 24, wherein the computing module (43) is located at a radio network controller (71).

26. The device of claim 24, wherein the product of pathloss and interference is approximated using a measurement report signal (65) from the mobile device, the measurement report signal (65) having a magnitude indicative of measured signal-to-interference ratio.

27. The device of claim 24, wherein the product of pathloss and interference is approximated by statistically examining other active users in a sector.

28. The device of claim 24, wherein the product of pathloss and interference is estimated based on an assumption that the mobile device is located in a sector where interference from outside the sector is a fixed proportion of interference from inside the sector.

29. The device of claim 21, wherein the ebno value is increased when a frame error is detected, and decreased when a frame is received correctly.

30. The device of claim 17, wherein the wireless telecommunications system employs wideband code division multiple access.

* * * * *